Patented July 9, 1940

2,207,116

UNITED STATES PATENT OFFICE 2,207,116

PROCESS FOR PREPARING A TRANSPARENT LAMINATED TUBE

Oscar A. Cherry, Chicago, Ill., and Charles A. Cabell, Washington, D. C., assignors to Economy Fuse & Manufacturing Company, Chicago, Ill., a corporation of New York No Drawing. Application September 30, 1935, Serial No. 42,885

3 Claims. (Cl. 154—2)

REISSUED
MAY 13 1941

This invention relates to a process of producing transparent laminated products and particularly transparent laminated tubes adapted for various industrial uses, such as electrical fuses and the like.

Heretofore, transparent tubes have been produced by uniting sheets of cellulose nitrate colloided by camphor. Similar articles have also been made from cellulose acetate, from glass, and from certain molded resins or resin like products, as for example, urea condensation products, and vinyl ester and styrol polymerization products.

All of these products suffer from defects which have seriously limited their industrial usage. The cellulose ester products and particularly the cellulose nitrate products are highly inflammable and are comparatively expensive. Glass is, of course, quite brittle. The urea products are less brittle than glass but the technical difficulties involved in the preparation of tubes and sheets are enormous. Furthermore, the products are not very heat resistant and are seriously affected by moisture. The vinyl derivatives are quite lacking in heat resistance and are at present, quite expensive.

The superior qualities of the non-transparent laminated tubes now on the market are well known. They are relatively non-inflammable, moisture resistant, strong and are non-brittle.

Accordingly, it is an object of the present invention to provide a process by which transparent, laminated tubes may be produced.

It is another object of the present invention to produce mechanically strong, transparent tubes.

It is another object of the present invention to provide a process by which such products may be produced cheaply and economically.

It is another object of the present invention to produce non-inflammable, transparent, laminated tubes.

Other objects will be apparent as the description of the invention proceeds.

As starting materials, a transparent cellulosic sheet is employed. As an example, the transparent cellulosic sheet known on the market as "Cellophane" may be employed. In conjunction with the cellulosic sheet an adhesive therefor may be used. This adhesive may be any good grade of gelatin or glue. In certain cases gum arabic may be employed but for reasons that will appear later the gelatin or glue is to be preferred.

As an illustration of a way by which the invention may be practiced, the preparation of a transparent, laminated tube will be described. Variations will occur to those skilled in the art to which this invention pertains and it is to be understood that the description is to be considered as illustrative and is not to be limited except by the scope of the appended claims.

In the preparation of a tube advantage is taken of the fact that a cellulosic sheet will swell when brought into contact with certain liquids, as for example, water, and will shrink or contract when the swelling agent is removed. Thus a swollen sheet is wound into the form of a tube on a mandrel or forming core and then dried. The contractile forces thereby set up exert themselves in such a manner as to cause the upper layers or laminations to press tightly upon those beneath. The result is a tightly wound, laminated tube, produced without the aid of external pressure, and dependent upon internal forces for its rigidity and homogeneity.

The use of an adhesive in conjunction with the swelling agent is desirable but not essential. When used it may be present for example, as a solute in the swelling agent. When gelatin is used as the adhesive, it is preferably present in such proportion that a 1½% solution is formed.

A simple method of carrying out the invention comprises drawing a cellulose sheet through a swelling agent, preferably water and preferably containing adhesive in solution, and then winding the swollen sheet upon a mandrel. A collapsible mandrel is preferably used since the afore-mentioned contractile forces are exerted in such a way as to hold the tube tightly on the mandrel, and a collapsible mandrel makes subsequent withdrawal of the mandrel easier. The mandrel with its windings of swollen sheet is then dried, preferably at a moderate temperature, as for example, approximately 75 degrees C.

This method as above described does not permit the formation of transparent, laminated tubes possessing any great wall thickness. For example, it has been found that the wall thickness in the case of a tube having an internal diameter of one-half inch should not greatly exceed 25/1000 of an inch. Of course it is desirable to produce tubes of greater thicknesses.

It has been found as the result of experimentation that if the thin walled tube produced as above described, is, after drying and while still on the mandrel, supplied with an additional wrapping of an equal or less thickness and again dried that the wrappings tightly adhere, and that, thereby a transparent tube with a wall thickness of twice that above described is obtained. This process may be repeated and thus transparent tubes of any desired wall thickness may be obtained.

In order to obtain non-inflammability in the product, flame proofing materials may be dissolved in the swelling water. A 6 to 10 per cent solution of a mixture of 80 per cent ammonium bromide and 20 per cent di-ammonium hydrogen phosphate gives excellent results. In this case gum arabic may not be used as the adhesive employed since the salts will precipitate it from solution.

If desired, the laminated products may be superficially waterproofed by being coated with a waterproofing varnish or lacquer. This varnish should preferably be substantially colorless and transparent.

In all cases, the cellulosic material is expanded or swollen prior to its application to the mandrel or forming core and thereafter dried to allow the laminated material thus formed to contract and adhere in the manner above describd. Articles so produced are rigid and strong due to the contraction of the overlying laminations which sets up internal stresses which are resisted by the stress in the outward direction of the underlying laminations which were dried and hardened on the mandrel or core.

The term "cellulosic material" as used in the specification and claims is intended to include only those cellulosic materials which are capable of being softened and swelled in liquids which are not solvents for the cellulosic material employed. Furthermore, this term does not include Cellophane of the type available on the market which has been treated with moisture-proof materials, such as would prevent the Cellophane from being swelled in liquids which are not solvents for the Cellophane.

We claim:

1. The method of producing a transparent tube which comprises placing an elongated, thin, transparent sheet of cellulose material capable of softening and swelling in water in contact with water until the same has become softened and swollen, thereupon applying said sheet while in a soft and swollen condition to a mandrel in superimposed laminations tightly applied one upon the other to form a tube of such limited thickness as to preserve the transparency of the tube and then drying the tube so formed and thereafter applying additional layers of water softened and swollen transparent cellulose material by tightly winding a sheet of the same on said previously formed and dried tube and again limiting the thickness thereof to preserve the transparency of the tube, and drying the additional laminations so applied.

2. The method of producing a transparent tube which comprises winding a transparent sheet of water-softened and swollen cellulose material into a tube having a plurality of superimposed laminations, but insufficient in number to materially impair the transparency of the tube when subsequently dried, drying the tube, thereafter winding and drying on said tube another sheet of transparent cellulose material softened and swollen as aforesaid, and repeating said winding and drying operations with a sheet of said treated material until a tube of desired thickness is produced, the number of laminations of each application before drying being insufficient to materially impair the transparency of the resulting tube when dried.

3. The method of producing a transparent tube which comprises contacting a transparent sheet of cellulose material capable of softening and swelling in water with water containing an adhesive until the cellulose material has become softened and swollen, thereupon winding said sheet into a tube having a plurality of superimposed laminations but insufficient in number to materially impair the transparency of the tube when subsequently dried, drying the tube, thereafter applying additional layers by winding on said tube another sheet of transparent cellulose material softened and swollen as aforesaid, said additional layers being insufficient in number to materially impair the transparency of the resulting tube, and then drying the additional layers.

OSCAR A. CHERRY.
CHARLES A. CABELL.